(12) United States Patent
Nagaoka et al.

(10) Patent No.: US 11,417,447 B2
(45) Date of Patent: Aug. 16, 2022

(54) FERRITE MAGNET

(71) Applicant: TDK CORPORATION, Tokyo (JP)

(72) Inventors: Junnichi Nagaoka, Tokyo (JP); Hitoshi Taguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 934 days.

(21) Appl. No.: 16/302,751

(22) PCT Filed: May 19, 2017

(86) PCT No.: PCT/JP2017/018858
§ 371 (c)(1),
(2) Date: Nov. 19, 2018

(87) PCT Pub. No.: WO2017/200092
PCT Pub. Date: Nov. 23, 2017

(65) Prior Publication Data
US 2019/0206594 A1    Jul. 4, 2019

(30) Foreign Application Priority Data

May 20, 2016 (JP) .............................. JP2016-101519
May 20, 2016 (JP) .............................. JP2016-101520

(51) Int. Cl.
| | |
|---|---|
| *H01F 1/03* | (2006.01) |
| *C04B 35/26* | (2006.01) |
| *H01F 1/11* | (2006.01) |
| *C01G 49/00* | (2006.01) |
| *C01G 51/00* | (2006.01) |
| *C04B 35/626* | (2006.01) |
| *H01F 1/10* | (2006.01) |

(52) U.S. Cl.
CPC ....... *H01F 1/0315* (2013.01); *C01G 49/0054* (2013.01); *C01G 51/68* (2013.01); *C04B 35/26* (2013.01); *C04B 35/2633* (2013.01); *C04B 35/62645* (2013.01); *H01F 1/10* (2013.01); *H01F 1/11* (2013.01); *C01P 2002/52* (2013.01); *C01P 2006/42* (2013.01); *C04B 2235/3274* (2013.01); *C04B 2235/3418* (2013.01); *C04B 2235/767* (2013.01); *C04B 2235/83* (2013.01)

(58) Field of Classification Search
CPC ...... H01F 1/10; H01F 1/0315; C01P 2006/42; C04B 35/2633; C04B 2235/3274; C04B 2235/3418; C04B 2235/83; C04B 2235/767
See application file for complete search history.

(56) References Cited

U.S. PATENT DOCUMENTS

| | | | |
|---|---|---|---|
| 6,139,766 A | | 10/2000 | Taguchi et al. |
| 2007/0138432 A1 | | 6/2007 | Minachi et al. |
| 2007/0246681 A1 | | 10/2007 | Minachi et al. |
| 2013/0285779 A1 * | | 10/2013 | Kobayashi ......... C01G 49/0054 |
| | | | 264/611 |

FOREIGN PATENT DOCUMENTS

| | | | |
|---|---|---|---|
| CN | 1217812 A | | 5/1999 |
| CN | 102924069 A | | 2/2013 |
| JP | 2000-195715 A | | 7/2000 |
| JP | 2005-45167 A | | 2/2005 |
| JP | 4591684 B2 | | 12/2010 |
| JP | 2012-209295 | * | 10/2012 |
| JP | 2012-209295 A | | 10/2012 |
| WO | 2012-090935 A1 | | 7/2012 |

OTHER PUBLICATIONS

Oct. 25, 2019 Office Action issued in Chinese Patent Application No. 201780031110.6.
U.S. Appl. No. 16/302,704, filed Nov. 19, 2018 in the name of Nagaoka et al.
Oct. 28, 2019 Office Action issued in Chinese Patent Application No. 201780031126.7.
Machine Translation of JP-2005-045167-A, 10 pages.
Oct. 5, 2021 Office Action issued in U.S. Appl. No. 16/302,704.
Aug. 8, 2017 International Search Report issued in International Patent Application No. PCT/JP2017/018858.
Nov. 20, 2018 International Preliminary Report on Patentability issued in International Patent Application No. PCT/JP2017/018858.
Oct. 1, 2020 Office Action Issued in U.S. Appl. No. 16/302,704.
Apr. 13, 2021 Office Action Issued in U.S. Appl. No. 16/302,704.
Drmota, A., "Synthesis of strontium hexaferrite nanoparticles prepared using co-precipitation method and microemulsion processing," Journal of Physics: Conference Series, 200, pp. 1-4, 2010.
May 27, 2022 Office Action issued in U.S. Appl. No. 16/302,704.

* cited by examiner

*Primary Examiner* — C Melissa Koslow
(74) *Attorney, Agent, or Firm* — Oliff PLC

(57) ABSTRACT

This ferrite magnet has a ferrite phase having a magnetoplumbite structure, and an orthoferrite phase, and is characterized in that the composition ratios of the total of each metal element A, R, Fe and Me is represented by expression (1) $A_{1-x}R_x(Fe_{12-y}Me_y)_z$, (in expression (1), A is at least one element selected from Sr, Ba, Ca and Pb; R is at least one element selected from the rare-earth elements (including Y) and Bi, and includes at least La, and Me is Co, or Co and Zn) and in that the content (m) of the orthoferrite phase is $0 < m < 28.0$ in mol %. The invention makes it possible to achieve a ferrite magnet with increased Br.

2 Claims, 4 Drawing Sheets

FERRITE MAGNET

TECHNICAL FIELD

The present invention relates to a ferrite magnet and particularly relates to improvement in residual magnetic flux density (Br) of the ferrite magnet.

BACKGROUND ART

Hexagonal based M-type (magnetoplumbite type) Sr ferrite or Ba ferrite is known as a material of a permanent magnet made of an oxide. A ferrite magnet made of these ferrites is used as a permanent magnet in the form of a sintered magnet or a bonded magnet. Along with the miniaturization and high performance of electronic components, permanent magnets made of ferrite magnets have also been demanded to have high magnetic characteristics while being small.

Residual magnetic flux density (Br) and coercive force (HcJ) are normally used as indicators of magnetic characteristics of permanent magnets, and a permanent magnet whose Br and HcJ are high is evaluated to have high magnetic characteristics. To improve Br and HcJ of permanent magnets, consideration has conventionally been made by change in composition, such as inclusion of a predetermined element into a ferrite magnet.

For example, Japanese Patent No. 4591684 (Patent Document 1) proposes an La—Co ferrite sintered magnet having a high residual magnetic flux density and a high coercive force, which could not be achieved by conventional M-type Sr ferrite or M-type Ba ferrite sintered magnets. This ferrite sintered magnet contains at least La and Co and is thereby referred to as a La—Co ferrite sintered magnet. Japanese Patent Application Laid-Open No. 2005-45167 (Patent Document 2) proposes a patent where a La—Co ferrite magnet contains a divalent iron ion.

On the other hand, Japanese Patent Application Laid-Open No. 2012-209295 (Patent Document 3) discloses that HcJ is improved by containing an orthoferrite phase in addition to an M-type Ca ferrite-La—Co ferrite phase. Furthermore, WO02012090935 (A1) discloses that an M-type CaLaCo ferrite magnet contains a third phase containing La at a higher atomic ratio than in a main phase containing La, and that HcJ or Hk/HcJ is thereby improved.

PATENT DOCUMENT

Patent Document 1: Japanese Patent No. 4591684
Patent Document 2: Japanese Patent Application Laid-Open No. 2005-45167
Patent Document 3: Japanese Patent Application Laid-Open No. 2012-209295
Patent Document 4: WO2012090935 (A1)

SUMMARY OF INVENTION

Technical Problem

As described above, the permanent magnets preferably have a high Br and a high HcJ, but it is not yet easy to obtain these characteristics favorably, and ferrite magnets that can easily and favorably obtain these characteristics are required. Meanwhile, ferrite magnets particularly having a high Br have been recently demanded as variable magnetic force magnets.

Patent Document 1 and Patent Document 2 disclose that the La—Co ferrite has high magnetic characteristics, but Br of the La—Co ferrite of Patent Document 1 and Patent Document 2 does not exceed 4.7 kG.

Patent Document 3 and Patent Document 4 disclose that a Ca—La—Co ferrite contains an orthoferrite phase or a third phase, and that HcJ is thereby improved. Patent Document 3 and Patent Document 4, however, disclose that Br of the Ca—La—Co ferrite is equal or inferior to Br of a ferrite failing to contain these phases.

The present invention has been achieved under such circumstances. It is an object of the invention to obtain a ferrite magnet whose Br is remarkably improved compared to magnetic characteristics of conventional La—Co ferrite sintered magnets.

Solution to Problem

To achieve the above object, the ferrite magnet of the present invention is a ferrite magnet including a ferrite phase having a magnetoplumbite structure and an orthoferrite phase, wherein a constitutional proportion of metal elements of A, R, Fe, and Me is represented by a formula (1) of $A_{1-x}R_x(Fe_{12-y}Me_y)_z$, where A is at least one element selected from Sr, Ba, Ca, and Pb, R is at least one element selected from rare earth elements (including Y) and Bi and R at least includes La, and Me is Co or Co and Zn, x, y, and z of the formula (1) satisfy the following formulae (2), (3), (4), and (5):

$$0.71 \leq x \leq 0.84 \quad (2);$$

$$0.30 \leq y \leq 0.60 \quad (3);$$

$$0.80 \leq z < 1.10 \quad (4);$$

$$1.60 < x/yz < 4.00 \quad (5), \text{ and}$$

$0 < m < 28.0$ is satisfied, where m is an orthoferrite-phase content by mol %.

In the ferrite magnet of the present invention, $0 < m < 28.0$ is satisfied, where m is an orthoferrite-phase content (mol %), and a high Br can thereby be obtained. Thus, the ferrite magnet of the present invention has sufficient Br and HcJ as a permanent magnet.

In general, when the M-type ferrite magnet contains a phase other than a ferrite phase having a magnetoplumbite structure (hereinafter, also referred to as an M-type ferrite phase or an M phase), an undesirable effect tend to influence magnetic characteristics as a ratio of this phase is larger. In particular, it is known that when an orthoferrite phase is contained, Br decreases.

In the present invention, however, the La—Co ferrite magnet contains an orthoferrite-phase, which is a factor of decrease in Br, and a surprising effect of being able to improve Br can be obtained on the contrary. The details of this reason is unclear, but it is conceivable that some magnetic interaction is exerted between the orthoferrite phase and the M-type ferrite phase in the composition range of the present invention.

To obtain the above effect more favorably, an orthoferrite-phase content (m) of the ferrite magnet is preferably $0 < m \leq 25.1$, more preferably $0 < m \leq 16.3$, by mol %.

Preferably, the ferrite magnet of the present invention further includes Si, and a Si content is more than 0.002 mass % and less than 0.15 mass % in terms of $SiO_2$.

Conventional ferrite sintered magnets contain a sintering aid containing Si as a grain boundary component and thereby have a high Br and a high HcJ. To obtain these effects, however, a relatively large amount of Si is contained, and a Si content is specifically set to about 0.3 to 1.3 mass % in terms of $SiO_2$.

On the other hand, the present invention can particularly obtain a surprising effect of dramatically improved Br by controlling a Si content in the very small range as described above, which is outside the common sense of those skilled in the art.

To achieve the above effects more favorably, a Si content is more preferably 0.03 to 0.11 mass %, still more preferably 0.03 to 0.09 mass %, in terms of $SiO_2$.

Advantageous Effects of Invention

The present invention can provide a ferrite magnet whose Br is remarkably improved compared to magnetic characteristics of conventional La—Co ferrite sintered magnets.

DESCRIPTION OF EMBODIMENTS

Figure 1:
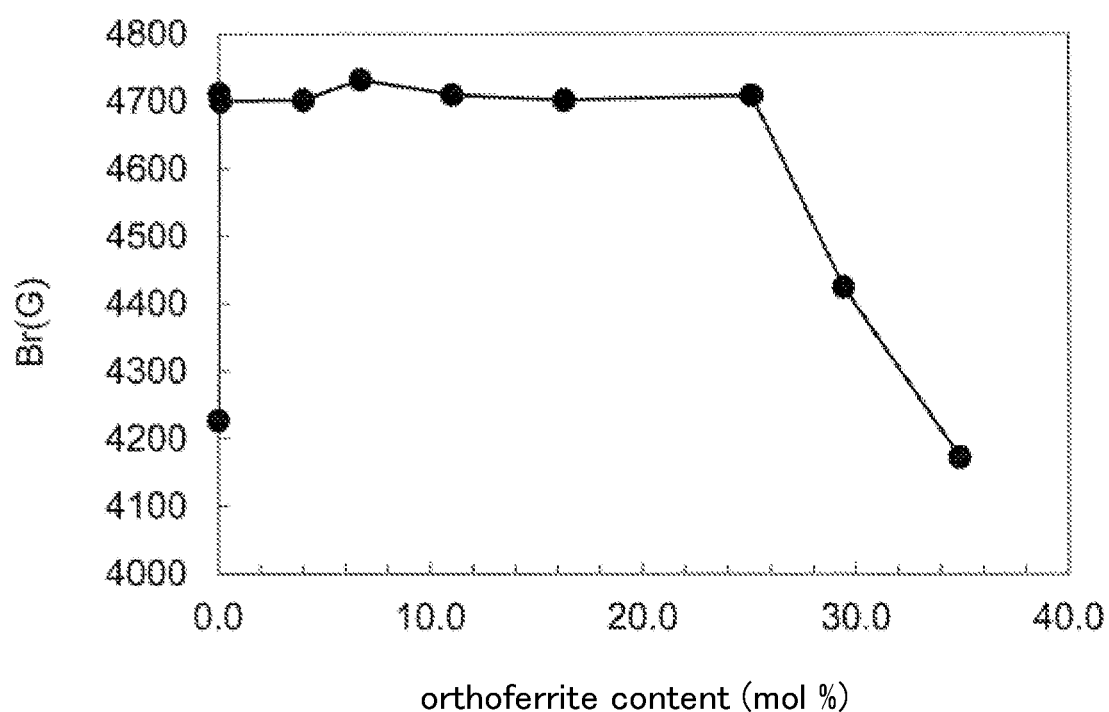
FIG. 1 is a figure illustrating a relation between orthoferrite content and Br of a ferrite magnet. (Experimental Example 1)
Figure 2:
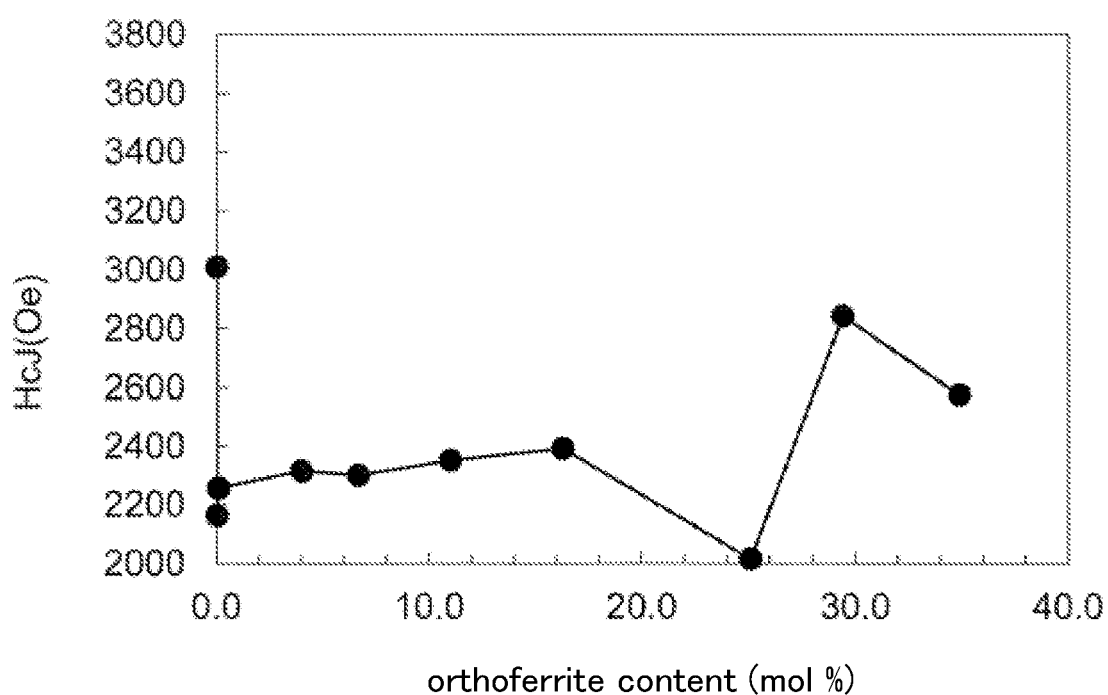
FIG. 2 is a figure illustrating a relation between orthoferrite content and HcJ of a ferrite magnet. (Experimental Example 1)
Figure 3:
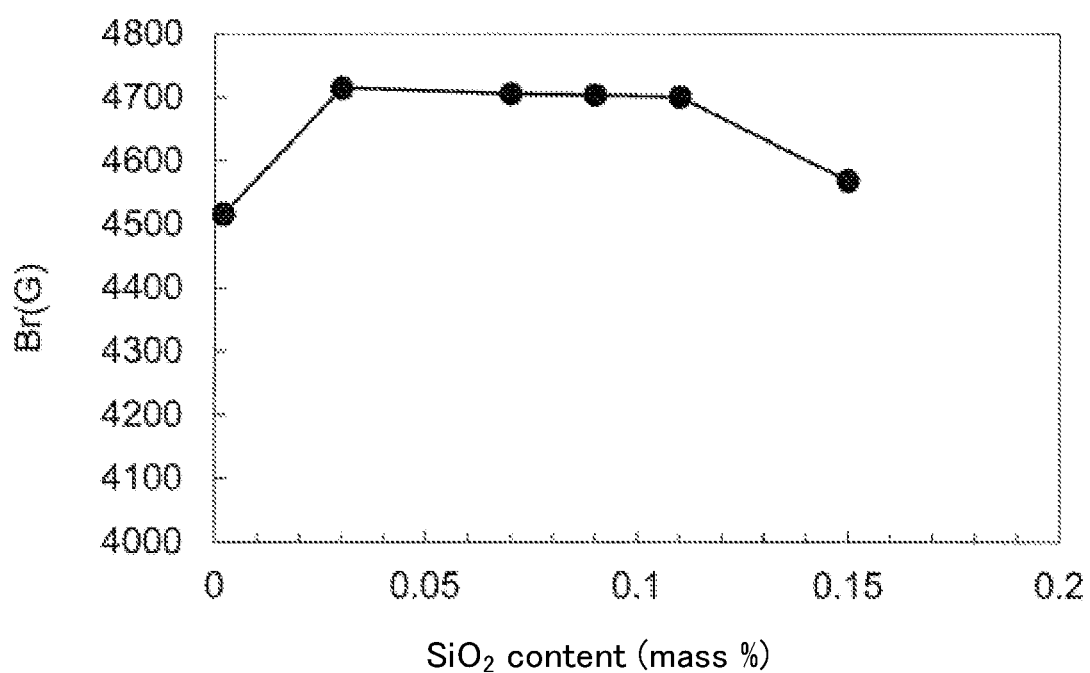
FIG. 3 is a figure illustrating a relation between $SiO_2$ content and Br of a ferrite sintered magnet. (Experimental Example 4)
Figure 4:
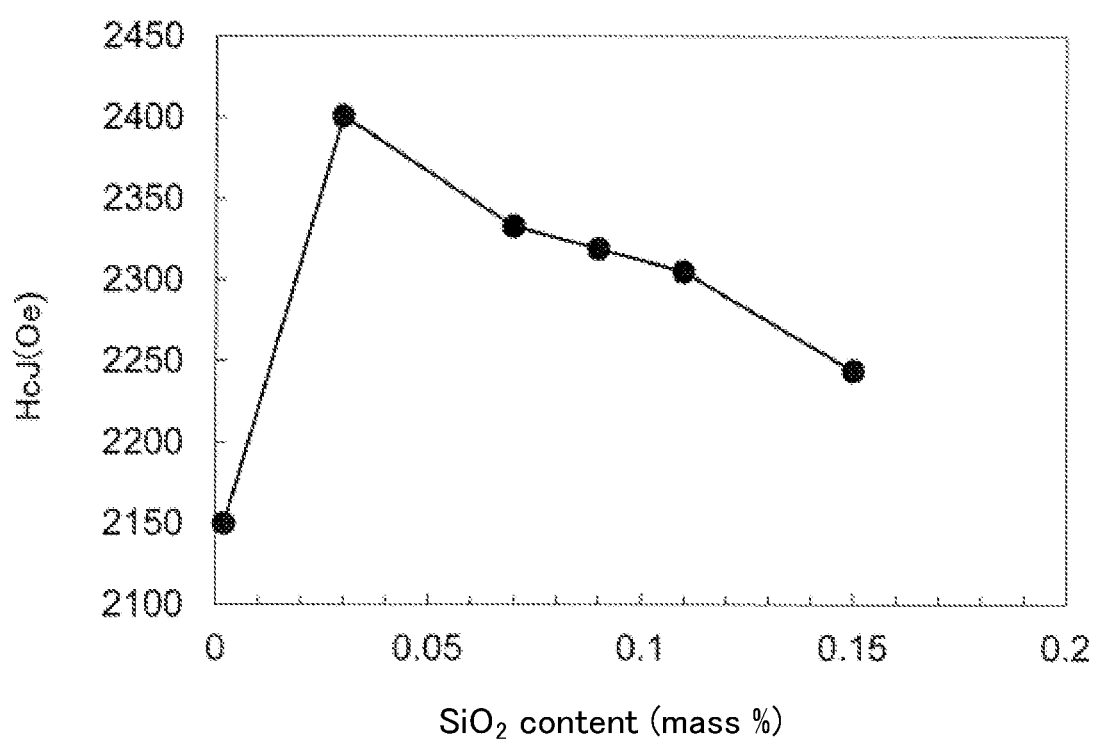
FIG. 4 is a figure illustrating a relation between $SiO_2$ content and HcJ of a ferrite sintered magnet. (Experimental Example 4)

The ferrite magnet according to the present embodiment is a ferrite magnet including a ferrite phase having a magnetoplumbite structure and an orthoferrite phase, wherein a constitutional proportion of metal elements of A, R, Fe, and Me is represented by a formula (1) of $A_{1-x}R_x(Fe_{12-y}Me_y)_z$, where A is at least one element selected from Sr, Ba, Ca, and Pb, R is at least one element selected from rare earth elements (including Y) and Bi and R at least includes La, and Me is Co or Co and Zn, x, y, and z of the formula (1) satisfy the following formulae (2), (3), (4), and (5):

$$0.71 \leq x \leq 0.84 \quad (2);$$

$$0.30 \leq y \leq 0.60 \quad (3);$$

$$0.80 \leq z < 1.10 \quad (4);$$

$$1.60 < x/yz < 4.00 \quad (5), \text{ and}$$

$0 < m < 28.0$ is satisfied, where m is an orthoferrite-phase content by mol %.

In the present embodiment, the composition of the whole ferrite magnet is expressed in terms of the above composition formula (1). Thus, when the ferrite magnet of the present embodiment contains a phase (e.g., orthoferrite, hematite, spinel, etc.) in addition to a phase having a magnetoplumbite structure, an amount of each element contained in these phases is converted into the formula (1).

In other words, "x", "y", and "z" are calculated by applying an amount of each element contained in the whole ferrite magnet to the formula (1).

Hereinafter, the above-mentioned ferrite magnet is explained in more detail.

A:

"A" is at least one element selected from Sr, Ba, Ca, and Pb. To improve coercive force (HcJ), "A" is most preferably at least Sr.

R(x):

"x" in the above composition formula (1) represents a proportion of substitution of "A" by "R". When "x" is less than 0.71 in the composition formula (1), that is, when an amount of "R" is too small, a solid solution amount of "R" in the ferrite magnet is insufficient, and Br and HcJ decrease. Meanwhile, when "x" is more than 0.84, Br and HcJ decrease. In the present invention, the range of "x" is thereby set to $0.71 \leq x \leq 0.84$. The value of "x" is preferably $0.74 \leq x \leq 0.84$, more preferably $0.76 \leq x \leq 0.84$, and still more preferably $0.76 \leq x \leq 0.81$.

"R" is at least one element selected from Bi and rare earth elements including Y, but to improve residual magnetic flux density (Br), "R" is preferably La. In the present invention, La is thereby essential.

Me(y):

"y" in the above composition formula (1) represents a proportion of substitution of Fe by "Me", that is, an amount of Co or an amount of Co+Zn. Similarly to "x", "y" is set to obtain a high residual magnetic flux density (Br) in the present invention. When "y" is less than 0.30, a solid solution amount of "Me" in the ferrite magnet is insufficient, and Br and HcJ decrease. On the other hand, when "y" is more than 0.60, there exists "Me", which is an excess element that cannot be substituted by solid solution in the hexagonal M-type ferrite. In the present invention, "y" is thereby set to $0.30 \leq y \leq 0.60$. The value of "y" is preferably $0.30 \leq y \leq 0.55$, more preferably $0.30 \leq y \leq 0.51$, and still more preferably $0.34 \leq y \leq 0.51$.

z:

"z" in the above composition formula (1) represents a ratio of a sum of Fe and Me to a sum of "A" and "R". When "z" is too small, the nonmagnetic phase including "A" and "R" increases, and a saturation magnetization thereby decreases. On the other hand, when "z" is too large, the $\alpha\text{-}Fe_2O_3$ phase or the spinel ferrite phase containing "Me" increases, and a saturation magnetization thereby decreases. In the present invention, "z" is thereby set to $0.80 \leq z < 1.10$. The value of "z" is preferably $0.80 \leq z \leq 1.04$, more preferably $0.84 \leq z \leq 1.04$, and still more preferably $0.84 \leq z \leq 1.00$.

x/yz:

x/yz in the above composition formula (1) represents a proportion of a substitution amount of "R" and a substitution amount of "Me". In the present embodiment, x/yz is $1.60 < x/yz < 4.00$. When "x", "y", and "z" satisfy this relation, favorable Br and HcJ can be obtained. When the proportion is too high or too low, Br and HcJ tend to rather decrease. The value of x/yz is preferably $1.62 \leq x/yz \leq 2.97$, more preferably $1.75 \leq x/yz \leq 2.97$, and still more preferably $1.75 \leq x/yz \leq 2.62$.

Orthoferrite Phase (m):

The ferrite magnet of the present embodiment contains an M phase (a ferrite phase having a magnetoplumbite structure) as the main phase and at least contains an orthoferrite phase in addition to the M phase. In the present embodiment, $0 < m < 28.0$ is satisfied, where "m" is an orthoferrite-phase content (mol %). Since an orthoferrite-phase content satisfies such a condition, a ferrite magnet having a high Br can be obtained.

When the orthoferrite-phase content is 0 mol %, however, a sufficient effect cannot be obtained, and Br and HcJ decrease. When the orthoferrite-phase content is too large, Br and HcJ may decrease, and the upper limit of the orthoferrite-phase content is desirably determined based on desired Br and HcJ. To obtain favorable Br and HcJ, the orthoferrite-phase content (m) is preferably 0.03 mol % or more, more preferably 0.1 mol % or more, and still more preferably 4.0 mol % or more. On the other hand, to obtain favorable Br and HcJ, the orthoferrite-phase content (m) is preferably 25.1 mol % or less, more preferably 16.3 mol % or less, and still more preferably 11.0 mol % or less.

Orthoferrite is an iron oxide represented by the chemical formula of $RFeO_3$ ("R" is a rare earth element or yttrium). Orthoferrite has a perovskite-type structure. Orthoferrite exhibits a weak magnetism at room temperature.

The ratio of "R", Fe, and O of orthoferrite is typically 1:1:3, but this ratio changes depending on composition and atmosphere. Furthermore, elements other than Fe may be substituted. The orthoferrite phase of the ferrite magnet of the present embodiment includes even these cases.

With respect to orthoferrite, for example, the paragraph 0026 of Patent Document 2 discloses that an orthoferrite phase, which was conventionally considered to be an unnecessary phase for magnets, is present in the magnet, and that the coercive force (HcJ) of the magnet can thereby be improved.

However, it is common knowledge of those skilled in the art to introduce a weak magnetic component or a nonmagnetic component into a strong magnetic component and to thereby decrease Br and increase HcJ. In the present invention, a strong magnetic component is reduced by introducing a weak magnetic component into the strong magnetic component, but this markedly improves Br, which is derived from ferromagnetism. This fact is an epoch-making knowledge that overturns conventional common sense.

In Patent Document 1, there is no suggestion of existence of an orthoferrite phase. On the contrary, Patent Document 1 eliminates the existence of the orthoferrite phase by setting a calcining temperature to 1350 to 1450° C. and thereby increasing the M phase ratio. In the present embodiment, however, an orthoferrite phase can be formed in the ferrite magnet by controlling the calcining temperature, the time to be held at the calcining temperature, the temperature rising and falling rates in the calcining step, and the like in the composition range.

The ferrite magnet of the present invention may be composed of an M phase and an orthoferrite phase, or may further contain a phase other than the M phase and the orthoferrite phase. Examples of phases other than the M phase and the orthoferrite phase include hematite phase and spinel phase.

In the present embodiment, a total of the M phase and the orthoferrite phase in the ferrite magnet is preferably 98.7 mol % or more, more preferably 99.2 mol % or more. In the ferrite magnet, the M phase is preferably 74.9 mol % or more, more preferably 83.7 mol % or more.

The existence of the M phase, the orthoferrite phase, the hematite phase, and the spinel phase in the ferrite magnet of the present embodiment can be confirmed by X-ray diffraction, electron beam diffraction, or the like under the following conditions. The molar ratio of these phases occupied in the structure of the ferrite magnet is determined by comparing an X-ray diffraction intensity for a mixture obtained by mixing powder samples of M-type ferrite, orthoferrite, hematite, and spinel at a predetermined ratio and an X-ray diffraction intensity for an actually manufactured ferrite magnet.

X-ray generator
Continuous rating: 3 kW
Tube voltage: 45 kV
Tube current: 40 mA
Sampling width: 0.02 deg
Scanning speed: 4.00 deg/min
Divergence slit: 1.00 deg
Scattering slit: 1.00 deg
Reception slit: 0.30 mm The composition formula (1) of the present embodiment represents a compositional ratio of metal elements of "A", "R", Fe, and "Me", but when O (oxygen) is also contained, the composition formula (1) of the present embodiment can be represented by $A_{1-x}R_x(Fe_{12-y}Me_y)_zO_{19}$. Here, the number of O (oxygen) atoms is 19, which represents a stoichiometric composition ratio of oxygen when "Me" is all divalent, Fe and "R" are all trivalent, and x=y and z=1 are satisfied.

Since "x", "y", and "z" vary within the above-mentioned ranges and can take various values, however, the number of atoms of oxygen varies based on values of "x", "y", and "z". For example, when the firing atmosphere is a reducing atmosphere, oxygen loss (vacancy) may occur. Furthermore, Fe is normally present in trivalent state in the M-type ferrite, but may change to divalent or so. In addition, Co and/or "Me" may also change in valence number, "R" may take a valence other than trivalent, and an orthoferrite phase is further contained. Thus, a ratio of oxygen to metal elements changes. From the above, the number of oxygen atoms may actually be deviated from 19, and the present invention also includes such a case.

Preferably, the ferrite magnet of the present embodiment further contains Si. Specifically, a Si content is preferably more than 0.002 mass % and less than 0.15 mass % in terms of $SiO_2$. When a Si content satisfies such a condition, a ferrite magnet having high Br and HcJ can be obtained. When a Si content is 0.002 mass % or less in terms of $SiO_2$, however, a sufficient effect cannot be obtained, and Br and HcJ decrease due to insufficient sintering. When a Si content is too large, Br and HcJ may decrease, and a Si content is thereby preferably determined based on desired Br and HcJ.

To obtain favorable Br and HcJ, a Si content is more preferably 0.03 to 0.11 mass %, still more preferably 0.03 to 0.09%, in terms of $SiO_2$.

The ferrite magnet according to the present embodiment may contain Ca as a sub-component in addition to Si. Si and Ca are added for the purpose of improving sinterability of the hexagonal M-type ferrite, controlling magnetic properties, adjusting a crystal grain size of the sintered body, and the like.

The ferrite magnet according to the present embodiment may contain components other than Si and Ca as sub-components, and may contain, for example, Al and/or Cr as other sub-components. When these elements are contained, HcJ of the permanent magnet tends to improve. To obtain a favorable improvement effect of HcJ, the amount of Al and/or Cr is preferably 0.1 mass % or more in total in terms of $Al_2O_3$ and $Cr_2O_3$ with respect to the whole ferrite magnet. However, these components may reduce Br of the permanent magnet, and the amount of these components is thereby preferably 3 mass % or less so as to obtain a favorable Br.

The sub-components may contain B as, for example, $B_2O_3$. When B is contained, it is possible to lower the calcining temperature and the firing temperature in obtaining a sintered body composed of a ferrite magnet and to obtain a permanent magnet with high productivity. When a B content is too large, however, the saturation magnetization of the permanent magnet may decrease, and a B content to the whole ferrite magnet is thereby preferably 0.5 mass % or less in terms of $B_2O_3$.

Furthermore, the ferrite magnet of the present embodiment may contain a sub-component of Ga, Mg, Cu, Mn, Ni, In, Li, Ti, Zr, Ge, Sn, V, Nb, Ta, Sb, As, W, Mo, etc. in the form of an oxide. In terms of an oxide having a stoichiometric composition of each atom, the amounts of these elements are preferably 5 mass % or less of gallium oxide, 5 mass % or less of magnesium oxide, 5 mass % or less of copper oxide, 5 mass % or less of manganese oxide, 5 mass % or less of nickel oxide, 3 mass % or less of indium oxide, 1 mass % or less of lithium oxide, 3 mass % or less of titanium oxide, 3 mass % or less of zirconium oxide, 3 mass % or less of germanium oxide, 3 mass % or less of tin oxide, 3 mass % or less of vanadium oxide, 3 mass % or less of niobium oxide, 3 mass % or less of tantalum oxide, 3 mass % or less of antimony oxide, 3 mass % or less of arsenic oxide, 3 mass % or less of tungsten oxide, and 3 mass % or less of molybdenum oxide. When a plurality of these are contained in combination, however, the total is preferably 5 mass % or less so as to avoid deterioration of magnetic characteristics.

Preferably, the ferrite magnet of the present embodiment does not contain a sub-component of alkali metal elements (Na, K, Rb, etc.). Alkali metal elements tend to reduce saturation magnetization of the permanent magnet, but may be contained, for example, in a raw material for obtaining a ferrite magnet. As long as alkali metal elements are contained unavoidably, alkali metal elements may be contained in the ferrite magnet. An amount of alkali metal elements that does not significantly influence magnetic characteristics is 3 mass % or less in total.

The composition of the ferrite magnet of the present embodiment can be measured by fluorescent X-ray quantitative analysis or so.

The ferrite magnet of the present embodiment has any form as long as it has the above composition. For example, the ferrite magnet of the present embodiment is a ferrite sintered magnet, a ferrite magnet powder, a bonded magnet where ferrite magnet powder is dispersed in a resin, a film-like magnetic layer contained in the magnetic recording medium, and the like.

For example, the ferrite sintered magnet and the bonded magnet are processed into predetermined shapes and used for a wide variety of applications as described below.

For example, the ferrite sintered magnet and the bonded magnet can be used as a motor for a motor vehicle, such as a fuel pump, a power window, an ABS (antilock brake system), a fan, a wiper, a power steering, an active suspension, a starter, a door lock, and an electric mirror.

Also, the ferrite sintered magnet and the bonded magnet can be used as a motor for OA/AV equipment, such as FDD spindle, VTR capstan, VTR rotary head, VTR reel, VTR loading, VTR camera capstan, VTR camera rotary head, VTR camera zoom, VTR camera focus, capstans of radio cassette players etc., CD/LD/MD spindle, CD/LD/MD loading, and CD/LD optical pickup.

Furthermore, the ferrite sintered magnet and the bonded magnet can be used as a motor for household electric appliances, such as air conditioner compressor, freezer compressor, electric tool driving, dryer fan, shaver driving, and electric toothbrush. Furthermore, the ferrite sintered magnet and the bonded magnet can be used as a motor for FA equipment, such as robot axle, joint drive, robot main drive, machine tool table drive, and machine tool belt drive.

For other applications, the ferrite sintered magnet and the bonded magnet can be used for a motor generator for motorcycle, a magnet for speaker or headphone, a magnetron tube, a magnetic field generator for MRI, a clamper for CD-ROM, a sensor for distributor, a sensor for ABS, a fuel or oil level sensor, a magnet latch, an isolator, and the like.

When the ferrite magnet of the present embodiment has a form of powder, this powder preferably has an average particle size of 0.1 to 5.0 µm. The powder for the bonded magnet more preferably has an average particle size of 0.1 to 2.0 µm, and still more preferably has an average particle size of 0.1 to 1.0 µm. In manufacturing the bonded magnet, a ferrite magnet powder is kneaded with various binders of resin, metal, rubber, etc. and pressed in a magnetic field or a non-magnetic field. Preferably, the binder is acrylonitrile butadiene rubber (NBR), chlorinated polyethylene, polyamide resin, and the like. After the pressing, the pressed material is hardened and turned into a bonded magnet.

(Manufacturing Method of Ferrite Sintered Magnet)

Next, a method of manufacturing a ferrite sintered magnet among the above-mentioned ferrite magnets is described. In the method of manufacturing the ferrite sintered magnet of the present embodiment, the ferrite sintered magnet can be manufactured through a blending step, a calcining step, a pulverizing step, a pressing step, and a firing step. Each step is described below.

<Blending Step>

In the blending step, raw materials of a ferrite magnet are blended to obtain a raw material composition. First, raw materials of the ferrite magnet can be compounds (raw material compounds) containing one or more elements among elements constituting the ferrite magnet. The raw material compounds are preferably powdery, for example. The raw material compounds can be an oxide of each element or a compound to be an oxide by firing (carbonate, hydroxide, nitrate, etc.), and examples of the raw material compounds include $SrCO_3$, $La(OH)_3$, $Pr_6O_{11}$, $Nd_2O_3$, ZnO, $Fe_2O_3$, $BaCO_3$, $CaCO_3$, and $Co_3O_4$. To achieve homogeneous blending, the powders of the raw material compounds preferably have an average particle size of about 0.1 to 2.0 µm, for example.

If necessary, the raw material powders may be blended with other sub-components of raw material compounds (elemental simple substance, oxide, etc.). The blending can be carried out, for example, by weighing each raw material so as to obtain a desired composition of the ferrite magnet and mixing and pulverizing the weighed raw materials for about 0.1 to 20 hours using a wet attritor, a ball mill, or the like. In the blending step, not all of the raw materials need to be mixed, and some of the raw materials may be added after the calcination described below.

<Calcining Step>

In the calcining step, the raw material powders obtained in the blending step are calcined. The calcination can be carried out, for example, in an oxidizing atmosphere of air or so. The calcining temperature is preferably 1000 to 1340° C., more preferably 1100 to 1340° C., and still more preferably 1250 to 1340° C. When the calcining temperature is in the preferable range, the orthoferrite phase can be contained in the ferrite magnet. The calcining time can be 1 second to 10 hours, preferably 1 second to 3 hours. The calcined body obtained by the calcination contains 98.7 mol % or more of the main phase (M phase) and the orthoferrite phase in total. The primary particle diameter of the main phase is preferably 10 µm or less, more preferably 2 µm or less.

In the calcination, the heating rate is preferably 5° C./min or more, more preferably 15° C./min or more, and the cooling rate is preferably 7 to 1000° C./min, more preferably 50 to 1000° C./min.

<Pulverizing Step>

In the pulverizing step, the calcined body formed into granules or lumps by the calcining step is pulverized and turned into a powder again. This facilitates pressing in the pressing step described below. In the pulverizing step, raw materials that are not blended in the blending step may be added (post-addition of raw materials). For example, the pulverizing step may be constituted by two steps of pulverizing the calcined body to a coarse powder (coarse pulverization) and finely pulverizing this coarse powder (fine pulverization).

The coarse pulverization can be carried out, for example, using a vibration mill or so until the average particle diameter reaches 0.5 to 5.0 µm. In the fine pulverization, the coarsely pulverized material obtained by the coarse pulverization is further pulverized by a wet attritor, a ball mill, a jet mill, or the like. The fine pulverization is carried out so that the average particle size of the finely pulverized material obtained is preferably about 0.08 to 2.0 µm, more preferably about 0.1 to 1.0 µm, and still more preferably about 0.2 to 0.8 µm. Preferably, the finely pulverized material has a specific surface area (for example, determined by the BET method) of about 7 to 14 $m^2/g$. A favorable pulverization time differs depending on the pulverization method. For example, the pulverization time is preferably 30 minutes to 10 hours when a wet attritor is used, and the pulverization time is preferably about 10 to 50 hours when a ball mill is used.

When some of the raw materials are added in the pulverizing step, the addition can be carried out, for example, in the fine pulverizing step. In the present embodiment, $La(OH)_3$, $Fe_2O_3$, $Co_3O_4$, etc. (orthoferrite component) can be added in the fine pulverization, but may be added in the blending step, the coarse pulverizing step, or the like. Orthoferrite may be added in the blending step, the coarse pulverizing step, the fine pulverizing step, or the like.

To increase the degree of magnetic orientation of the sintered body obtained after firing, for example, a polyhydric alcohol represented by a general formula of $C_n(OH)_n H_{n+2}$ is preferably added in the fine pulverizing step. In the polyhydric alcohol represented by the general formula, "n" is preferably 4 to 100, more preferably 4 to 30, still more preferably 4 to 20, and further still more preferably 4 to 12. For example, the polyhydric alcohol is sorbitol. Two or more polyhydric alcohols may be used in combination. In addition to the polyhydric alcohol, other known dispersants may be used in combination.

When a polyhydric alcohol is added, an addition amount of the polyhydric alcohol is preferably 0.05 to 5.0 mass %, more preferably 0.1 to 3.0 mass %, and still more preferably 0.2 to 2.0 mass % with respect to an addition target (e.g., coarsely pulverized material). The polyhydric alcohol added in the fine pulverizing step is removed by thermal decomposition in the firing step described below.

<Pressing Step>

In the pressing step, the pulverized material obtained after the pulverizing step (preferably, finely pulverized material) is pressed in a magnetic field to obtain a green compact. The pressing can be carried out by dry pressing or wet pressing. To increase the degree of magnetic orientation, the pressing is preferably carried out by wet pressing. When the pressing is carried out by wet pressing, for example, it is preferable to obtain a slurry by performing the above-mentioned fine pulverizing step in a wet state and then to concentrate the slurry to a predetermined concentration to obtain a slurry for wet pressing. The slurry can be concentrated by centrifugal separation, filter press, or the like. Preferably, the finely pulverized material accounts for about 30 to 80 mass % to the total amount of the slurry for wet pressing. In the slurry, water is preferable as a dispersion medium for dispersing the finely pulverized material. In this case, the slurry may be added with a surfactant of gluconic acid, gluconate, sorbitol, or the like. The dispersion medium may be a nonaqueous solvent. The nonaqueous solvent may be an organic solvent of toluene, xylene, or the like. In this case, a surfactant of oleic acid or so is preferably added. The slurry for wet pressing may be prepared by adding a dispersion medium or so to the finely pulverized material in a dry state after the fine pulverization.

In the wet pressing, the slurry for wet pressing is subsequently pressed in a magnetic field. In that case, the pressing pressure is preferably about 9.8 to 49 MPa (0.1 to 0.5 ton/$cm^2$), and the magnetic field to be applied is preferably about 398 to 1194 kA/m (5 to 15 kOe).

<Firing Step>

In the firing step, the green compact obtained in the pressing step is fired and turned into a sintered body. A permanent magnet (ferrite sintered magnet) composed of the sintered body of the ferrite magnet as described above is thereby obtained. The firing can be performed in an oxidizing atmosphere of air or so. The firing temperature is preferably 1050 to 1340° C., more preferably 1250 to 1340° C. The firing time (the time where the firing temperature is held) is preferably about 0.5 to 3 hours.

When the green compact is obtained by wet pressing as described above, if the green compact is fired without sufficiently being dried, the green compact containing a dispersion medium or so is heated rapidly, and the dispersion medium or so is volatilized severely, which may cause cracks in the green compact. To avoid such inconveniences, for example, the green compact is thereby preferably dried sufficiently by being heated from a room temperature to about 100° C. at a slow heating rate of about 0.5° C./min before the temperature reaches the above-mentioned firing temperature. Furthermore, when a surfactant (dispersant) or so is added, the surfactant (dispersant) is preferably sufficiently removed (degreasing treatment) by, for example, heating the green compact at a heating rate of about 2.5° C./min in a temperature range of about 100 to 500° C. These treatments may be performed at the beginning of the firing step or may be performed separately before the firing step.

The heating rate from about 500° C. to the firing temperature and/or the cooling rate is/are preferably 6 to 200° C./min, more preferably 25 to 200° C./min.

A favorable method of manufacturing the ferrite sintered magnet is described above, but the above method is not only one method as far as at least the ferrite magnet according to the present embodiment is used, and conditions or so may appropriately be changed.

When a bonded magnet is manufactured instead of a ferrite sintered magnet, for example, a bonded magnet containing powder of the ferrite magnet of the present embodiment can be obtained by, for example, carrying out the above-mentioned steps until the pulverizing step, mixing the pulverized material obtained and the binder, and pressing the mixture in a magnetic field.

EXAMPLES

Hereinafter, the present invention is described in more detail with reference to examples, but the present invention is not limited to these examples.

[Experimental Example 1] (Manufacture of Ferrite Sintered Magnet)

First, iron oxide ($Fe_2O_3$), strontium carbonate ($SrCO_3$), cobalt oxide ($Co_3O_4$), and lanthanum hydroxide ($La(OH)_3$) were prepared as raw materials of a main composition of a ferrite magnet, and these raw materials were weighed so that the composition after calcination would be the following composition formula.

$A_{1-x}R_x(Fe_{12-y}Me_y)_z$     Composition Formula:

a heating rate of 5° C./min from the room temperature to 500° C. and a heating rate of 55° C./min from 500° C. to 1310° C. After the holding, a firing step was carried out by reducing the temperature to the room temperature at a cooling rate of 100° C./min, and ferrite sintered magnets were thereby obtained (firing step).

The upper and lower surfaces of the cylinder of each ferrite sintered magnet obtained in Experimental Example 1 were processed, and Br and HcJ of the ferrite sintered magnets were obtained using a B-H tracer with the maximum applied magnetic field of 955 kA/m (12 kOe). Furthermore, the ratios (mol %) of the M phase (ferrite phase having a magnetoplumbite structure), the orthoferrite phase, and the hematite phase in each of the ferrite sintered magnets obtained in Experimental Example 1 were obtained by the X-ray diffraction described above. The obtained results are summarized in Table 1.

TABLE 1

| No. | composition formula: $A_{1-x}R_x(Fe_{12-y}Me_y)_z$ | | | | firing temperature | Br | HcJ | M phase | orthoferrite phase | hematite phase |
|---|---|---|---|---|---|---|---|---|---|---|
| | x | y | z | x/yz | (° C.) | (G) | (Oe) | (mol %) | (mol %) | (mol %) |
| 1-1 | 0.80 | 0.53 | 0.70 | 2.15 | 1310 | 4173 | 2575 | 65.1 | 34.9 | 0.0 |
| 1-2 | 0.80 | 0.50 | 0.75 | 2.15 | 1310 | 4425 | 2843 | 70.6 | 29.4 | 0.0 |
| 1-3 | 0.80 | 0.47 | 0.80 | 2.15 | 1310 | 4709 | 2016 | 74.9 | 25.1 | 0.0 |
| 1-4 | 0.80 | 0.43 | 0.84 | 2.20 | 1310 | 4702 | 2392 | 83.7 | 16.3 | 0.0 |
| 1-5 | 0.80 | 0.41 | 0.90 | 2.15 | 1310 | 4710 | 2351 | 89.0 | 11.0 | 0.0 |
| 1-6 | 0.80 | 0.39 | 0.94 | 2.16 | 1310 | 4732 | 2301 | 93.3 | 6.7 | 0.0 |
| 1-7 | 0.80 | 0.39 | 0.95 | 2.16 | 1310 | 4702 | 2315 | 96.0 | 4.0 | 0.0 |
| 1-8 | 0.80 | 0.37 | 1.00 | 2.15 | 1310 | 4700 | 2257 | 99.1 | 0.1 | 0.8 |
| 1-9 | 0.80 | 0.35 | 1.04 | 2.20 | 1310 | 4712 | 2164 | 98.67 | 0.03 | 1.3 |
| 1-10 | 0.80 | 0.35 | 1.10 | 2.08 | 1310 | 4227 | 3010 | 94.7 | 0.00 | 5.3 |

In the formula, A=Sr, R=La, and Me=Co are satisfied, and x=0.80, y=0.35, and z=1.10 are satisfied.

The weighed raw materials were subsequently mixed and pulverized for 1 hour with a wet attritor to obtain a slurry (blending step). The slurry was dried and thereafter calcined by holding at 1310° C. for 2 hours in air provided that the heating rate and the cooling rate were 15° C./min (calcining step).

The obtained calcined powder was coarsely pulverized for 10 minutes with a small rod vibration mill. The coarsely pulverized material was added with iron oxide, strontium carbonate, cobalt oxide, and lanthanum hydroxide so that the sintered body after firing had the composition in Table 1 by the following composition formula. Furthermore, $SiO_2$ was added to the sintered body after firing so that the $SiO_2$ content was 0.04 mass %. This mixture was finely pulverized for 40 hours using a wet ball mill to obtain a slurry (so far, pulverizing step).

$A_{1-x}R_x(Fe_{12-y}Me_y)_z$     Composition Formula:

In the formula, A=Sr, R=La, and Me=Co are satisfied.

The slurry obtained after the fine pulverization was adjusted and turned into a slurry for wet pressing so that the solid content concentration was 73 to 75%. The slurry for wet pressing was pressed in a magnetic field of 796 kA/m (10 kOe) using a wet magnetic field pressing machine to obtain a green compact having a cylindrical shape whose diameter was 30 mm and thickness was 15 mm (pressing step).

The obtained green compact was sufficiently dried at a room temperature in air and held at 1310° C. for 1 hour with As shown in Table 1, it was found that when the orthoferrite-phase content (m) was more than 0 mol % and less than 28.0 mol %, a sintered body having Br of 4.7 (kG) or more and HcJ of 2.0 (kOe) or more was obtained, and that a high Br and a favorable HcJ could be obtained. It was also found that when "z" was 0.80 or more and less than 1.10, a sintered body having Br of 4.7 (kG) or more and HcJ of 2.0 (kOe) or more was obtained, and that a high Br and a favorable HcJ could be obtained.

[Experimental Example 2] (Manufacture of Ferrite Sintered Magnet)

In Experiment Example 2, ferrite sintered magnets were manufactured in a similar manner to Experimental Example 1 except that the composition of the sintered body after firing was set to be the composition formula in Table 2, that $SiO_2$ was added to the coarsely pulverized material so that the Si content to the sintered body after firing would be 0.05 mass % in terms of $SiO_2$, and that the firing temperature was 1290° C.

In Experimental Example 2, various ferrite sintered magnets of Samples 2-1 to 2-8 were manufactured particularly by greatly changing the atomic ratio of La (x=0.51 to 0.91). Br(G), HcJ(Oe), and ratios of M phase, orthoferrite phase, and hematite phase of each ferrite sintered magnet obtained in Experimental Example 2 were determined in a similar manner to Experimental Example 1. The obtained results are shown in Table 2.

TABLE 2

| No. | composition formula: $A_{1-x}R_x(Fe_{12-y}Me_y)_z$ | | | | firing temperature (° C.) | Br (G) | HcJ (Oe) | M phase ratio (mol %) | orthoferrite phase (mol %) | hematite phase (mol %) |
|---|---|---|---|---|---|---|---|---|---|---|
| | x | y | z | x/yz | | | | | | |
| 2-1 | 0.51 | 0.33 | 0.94 | 1.64 | 1290 | 4533 | 2089 | 100.0 | 0.0 | 0.0 |
| 2-2 | 0.58 | 0.38 | 0.94 | 1.62 | 1290 | 4568 | 2142 | 99.5 | 0.5 | 0.0 |
| 2-3 | 0.71 | 0.41 | 0.94 | 1.84 | 1290 | 4701 | 2169 | 98.8 | 1.2 | 0.0 |
| 2-4 | 0.76 | 0.41 | 0.94 | 1.97 | 1290 | 4705 | 2204 | 96.0 | 4.0 | 0.0 |
| 2-5 | 0.81 | 0.41 | 0.94 | 2.10 | 1290 | 4733 | 2307 | 93.3 | 6.7 | 0.0 |
| 2-6 | 0.84 | 0.41 | 0.94 | 2.18 | 1290 | 4710 | 2250 | 91.1 | 8.9 | 0.0 |
| 2-7 | 0.88 | 0.41 | 0.94 | 2.28 | 1290 | 4109 | 2503 | 86.2 | 13.6 | 0.8 |
| 2-8 | 0.91 | 0.41 | 0.94 | 2.36 | 1290 | 3708 | 2604 | 76.1 | 20.9 | 3.0 |

As shown in Table 2, it was found that when the ratio (x) of La was 0.71 or more and 0.84 or less, a sintered body having Br of 4.7 (kG) or more and HcJ of 2.0 (kOe) or more was obtained, and that a high Br and a favorable HcJ could be obtained.

[Experimental Example 3] (Manufacture of Ferrite Sintered Magnet)

In Experimental Example 3, ferrite sintered magnets were manufactured in a similar manner to Experimental Example 1 except that the composition of the sintered body after firing was set to be the composition formula in Table 3, and that $SiO_2$ was added to the coarsely pulverized material so that the Si content to the sintered body after firing would be 0.05 mass % in terms of $SiO_2$.

In Experimental Example 3, various ferrite sintered magnets of Samples 3-1 to 3-7 were manufactured particularly by greatly changing the atomic ratio of Co (y=0.20 to 0.61). Br(G), HcJ(Oe), and ratios of M phase, orthoferrite phase, hematite phase, and spinel phase of each ferrite sintered magnet obtained in Experimental Example 3 were determined in a similar manner to Experimental Example 1. The obtained results are shown in Table 3.

rials were weighed so that the composition after calcination would be the following composition formula.

$A_{1-x}R_x(Fe_{12-y}Me_y)_z$  Composition Formula:

In the formula, A=Sr, R=La, and Me=Co are satisfied, and x=0.80, y=0.35, and z=0.94 are satisfied.

The weighed raw materials were subsequently mixed and pulverized for 1 hour with a wet attritor to obtain a slurry (blending step). This slurry was dried and thereafter calcined by holding at 1310° C. for 2 hours in air provided that the heating rate and the cooling rate were 15° C./min (calcining step).

The obtained calcined powder was coarsely pulverized for 10 minutes with a small rod vibration mill. $SiO_2$ was added to the coarsely pulverized material so that the Si content to the sintered body after firing would be the value of Table 1 in terms of $SiO_2$. This mixture was finely pulverized for 40 hours using a wet ball mill to obtain a slurry (so far, pulverizing step).

The slurry obtained after the fine pulverization was adjusted and turned into a slurry for wet pressing so that the solid content concentration was 73 to 75%. This slurry for wet pressing was pressed in a magnetic field of 796 kA/m (10 kOe) using a wet magnetic field pressing machine to

TABLE 3

| No. | composition formula: $A_{1-x}R_x(Fe_{12-y}Me_y)_z$ | | | | firing temperature (° C.) | Br (G) | HcJ (Oe) | M phase ratio (mol %) | orthoferrite phase (mol %) | hematite phase (mol %) | spinel phase (mol %) |
|---|---|---|---|---|---|---|---|---|---|---|---|
| | x | y | z | x/yz | | | | | | | |
| 3-1 | 0.84 | 0.20 | 0.94 | 4.47 | 1310 | 3738 | 2653 | 94.6 | 5.4 | 0.0 | 0.0 |
| 3-2 | 0.84 | 0.30 | 0.94 | 2.97 | 1310 | 4705 | 2133 | 94.3 | 5.7 | 0.0 | 0.0 |
| 3-3 | 0.84 | 0.34 | 0.94 | 2.62 | 1310 | 4713 | 2222 | 92.9 | 7.1 | 0.0 | 0.0 |
| 3-4 | 0.84 | 0.43 | 0.94 | 2.07 | 1310 | 4721 | 2333 | 93.6 | 6.4 | 0.0 | 0.0 |
| 3-5 | 0.84 | 0.51 | 0.94 | 1.75 | 1310 | 4709 | 2014 | 93.5 | 6.5 | 0.0 | 0.0 |
| 3-6 | 0.84 | 0.55 | 0.94 | 1.02 | 1310 | 4706 | 2001 | 93.6 | 6.4 | 0.0 | 0.0 |
| 3-7 | 0.84 | 0.61 | 0.94 | 1.46 | 1310 | 4415 | 2528 | 92.5 | 6.0 | 0.0 | 1.5 |

As shown in Table 3, it was found that when the ratio (y) of Co was 0.30 or more and less than 0.61, a sintered body having Br of 4.7 (kG) or more and HcJ of 2.0 (kOe) or more was obtained, and that a high Br and a favorable HcJ could be obtained. It was also found that when x/yz was more than 1.60 and less than 4.00, a sintered body having Br of 4.7 (kG) or more and HcJ of 2.0 (kOe) or more was obtained, and a high Br and a favorable HcJ could be obtained.

[Experimental Example 4] (Manufacture of Ferrite Sintered Magnet)

In Experimental Example 4, iron oxide ($Fe_2O_3$), strontium carbonate ($SrCO_3$), cobalt oxide ($Co_3O_4$), and lanthanum hydroxide ($La(OH)_3$) were prepared as raw materials of a main composition of a ferrite magnet, and these raw materials were weighed so that the composition after calcination would be the following composition formula.

obtain a green compact having a cylindrical shape whose diameter was 30 mm and thickness was 15 mm (pressing step).

The obtained green compact was sufficiently dried at a room temperature in air and held for 1 hour at 1300° C. with a heating rate of 5° C./min from the room temperature to 500° C. and a heating rate of 55° C./min from 500 to 1300° C. After the holding, a firing step was carried out by reducing the temperature to the room temperature at a cooling rate of 100° C./min, and ferrite sintered magnets were thereby obtained (firing step).

Br(G), HcJ(Oe), and ratios of M phase, orthoferrite phase, hematite phase, and spinel phase of each ferrite sintered magnet obtained in Experimental Example 4 were determined in a similar manner to Experimental Example 3. The obtained results are shown in Table 4.

TABLE 4

| No. | composition formula: $A_{1-x}R_x(Fe_{12-y}Me_y)_z$ | | | | sub-component $SiO_2$ content (mass %) | firing temperature (° C.) | Br (G) | HcJ (Oe) | M phase (mol %) | orthoferrite phase (mol %) | hematite phase (mol %) |
| --- | --- | --- | --- | --- | --- | --- | --- | --- | --- | --- | --- |
| | x | y | z | x/yz | | | | | | | |
| 4-1 | 0.80 | 0.35 | 0.94 | 2.15 | 0.002 | 1300 | 4516 | 2150 | 96.1 | 3.9 | 0.0 |
| 4-2 | 0.80 | 0.35 | 0.94 | 2.15 | 0.03 | 1300 | 4715 | 2401 | 94.1 | 5.9 | 0.0 |
| 4-3 | 0.80 | 0.35 | 0.94 | 2.15 | 0.07 | 1300 | 4706 | 2333 | 92.9 | 7.1 | 0.0 |
| 4-4 | 0.80 | 0.35 | 0.94 | 2.15 | 0.09 | 1300 | 4704 | 2319 | 94.5 | 5.5 | 0.0 |
| 4-5 | 0.80 | 0.35 | 0.94 | 2.15 | 0.11 | 1300 | 4701 | 2305 | 92.7 | 7.3 | 0.0 |
| 4-6 | 0.80 | 0.35 | 0.94 | 2.15 | 0.15 | 1300 | 4569 | 2244 | 90.3 | 9.7 | 0.0 |

As shown in Table 4, it was found that when the $SiO_2$ content was more than 0.002 mass % and less than 0.15 mass %, a sintered body having Br of 4.7 (kG) or more and HcJ of 2.0 (kOe) or more was obtained, and that a high Br and a favorable HcJ could be obtained.

INDUSTRIAL APPLICABILITY

The ferrite sintered magnet according to the present invention is favorable as a variable magnetic force magnet, and can also favorably be used for automotive electrical components, such as various motors, generators, and speakers, parts for electrical components, and the like. In particular, the ferrite sintered magnet according to the present invention can contribute to miniaturization, weight reduction, and high efficiency of these components.

The invention claimed is:

1. A ferrite magnet comprising a ferrite phase having a magnetoplumbite structure and an orthoferrite phase, wherein a constitutional proportion of metal elements of A, R, Fe, and Me is represented by a formula (1) of $A_{1-x}R_x(Fe_{12-y}Me_y)_z$, where A is at least one element selected from Sr, Ba, Ca, and Pb, R is at least one element selected from rare earth elements (including Y) and Bi and R at least includes La, and Me is Co or Co and Zn, x, y, and z of the formula (1) satisfy the following formulae (2), (3), (4), and (5):

$$0.71 \leq x \leq 0.84 \quad (2);$$

$$0.30 \leq y \leq 0.60 \quad (3);$$

$$0.80 \leq z < 1.10 \quad (4);$$

$$1.60 < x/yz < 4.00 \quad (5), \text{ and}$$

$0 < m < 28.0$ is satisfied, where m is an orthoferrite-phase content by mol %.

2. The ferrite magnet according to claim 1, further comprising Si, wherein a Si content is more than 0.002 mass % and less than 0.15 mass % in terms of $SiO_2$.

* * * * *